(No Model.)
E. V. STINE.
WEED CUTTER.
No. 590,634. Patented Sept. 28, 1897.
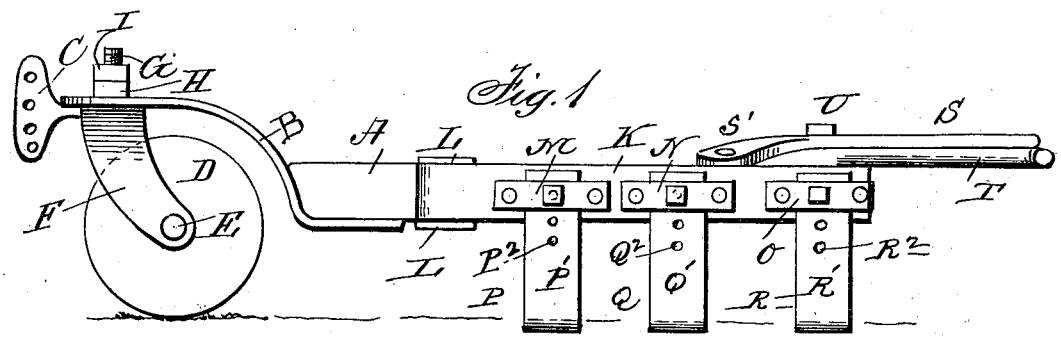
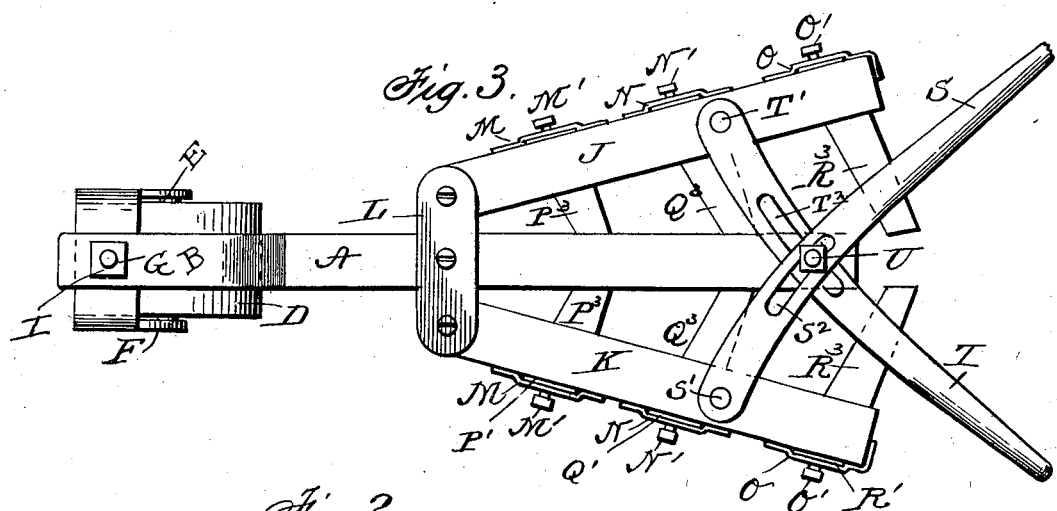
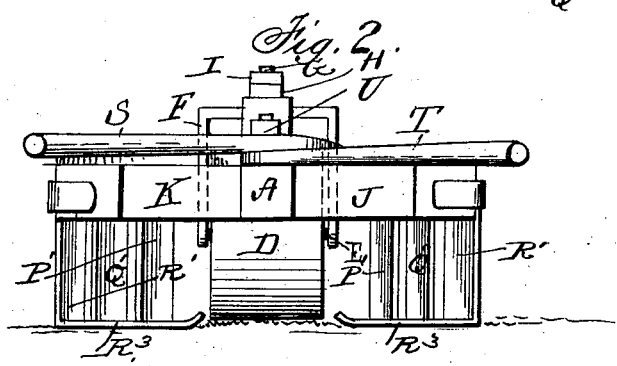
Witnesses:
F. L. Ourand
K. A. Kau
Inventor,
Eugene V. Stine,
by John Wedderburn
Attorney

UNITED STATES PATENT OFFICE.

EUGENE V. STINE, OF BRUNEAU VALLEY, IDAHO.

WEED-CUTTER.

SPECIFICATION forming part of Letters Patent No. 590,634, dated September 28, 1897.

Application filed June 22, 1896. Serial No. 596,532. (No model.)

*To all whom it may concern:*

Be it known that I, EUGENE V. STINE, a citizen of the United States, residing at Bruneau Valley, in the county of Owyhee and State of Idaho, have invented certain new and useful Improvements in Weed-Cutters; and I do hereby declare the following to be a full, clear, and exact description of the invention, such as will enable others skilled in the art to which it appertains to make and use the same.

My invention relates to weed-cutters.

My object is to provide a simple and cheap weed-cutter which will more satisfactorily perform the cutting operation.

Having this object in view, the invention consists of those novel features and combinations appearing more in detail hereinafter.

In the accompanying drawings, Figure 1 is a side elevation; Fig. 2, a rear elevation, and Fig. 3 a plan view.

A designates the main beam of the frame, and B an upwardly-bent draft-iron which is connected to the front end thereof and is provided with the usual clevis C. I employ a wheel D, which is journaled on an axle E, which in turn extends across the arms of a swivel-iron F, that straddles the wheel. This swivel-frame is swiveled to the front end of the draft-iron by a screw-threaded bolt G, which passes through the swivel-frame and draft-iron and carries an adjusting-nut H and a jam-nut I. This construction permits of vertical adjustment of the draft-iron and main beam and yet allows easy swinging of the swivel-frame. There are two auxiliary beams J and K, which are pivotally connected to a double hanger L near the front end of the main beam, thereby forming wings, as it were. Each auxiliary beam carries three clamping-guides M, N, and O, having set-screws M', N', and O', respectively. I provide three cutters P, Q, and R, whose shanks P', Q', and R' are adapted to slide in the respective clamping-guides and are provided with series of holes $P^2$, $Q^2$, and $R^2$ for the reception of the adjusting-screws, so that the cutters may be adjusted to any desired height. The cutters are provided with inwardly-bent tapering blades $P^3$, $Q^3$, and $R^3$. It will be observed that the respective cutters are arranged in a series, the foremost cutter being the smallest, the intermediate cutter somewhat larger, and the rear cutter the largest. I provide adjusting-handles S and T, which are pivoted to the auxiliary beams by respective bolts or screws S' and T' and are provided with curved slots $S^2$ and $T^2$. These handles cross each other, and a screw-threaded bolt U, arising from the main beam and passing through the slots and provided with a jam-nut V, is the means for clamping the handles and holding the adjustable beams in position. When adjusted as shown, it will be observed that the opposite cutting-blades converge rearwardly.

My invention is peculiarly adapted for use in weeding around almost every variety of plant or vegetable and cuts the weeds off below the surface of the ground, at the same time loosening the dirt and drawing it away from the young plants in such manner that they are not covered, as has heretofore generally been the case with weed-cutters. The swiveled wheel allows the machine to be easily turned and directed to the weeds.

It is to be understood that I do not limit myself to the precise construction herein shown and described, but consider myself entitled to all such variations as come within the spirit and scope of the invention.

Having thus described the invention, what is claimed as new is—

In a weed-cutter, the combination with a main beam, of auxiliary beams connected to said main beam and diverging rearwardly, and L-shaped cutters connected to the auxiliary beams one behind the other and the cutters carried by the respective beams being so disposed that the lower horizontal portions of the cutters of each beam converge rearwardly in relation to the cutters of the other beam.

In testimony whereof I have signed this specification in the presence of two subscribing witnesses.

EUGENE V. STINE.

Witnesses:
 GEORGE M. HALL,
 ISAAC J. SEABO.